United States Patent
Mesing et al.

(10) Patent No.: US 7,762,502 B2
(45) Date of Patent: Jul. 27, 2010

(54) POLYIMIDE RESIN AND CARBON FIBER MOLDED TUBE CLAMP

(75) Inventors: Thomas Carl Mesing, Loveland, OH (US); Allan Robert Sieckman, Cincinnati, OH (US); Stephen Mark Whiteker, Covington, KY (US)

(73) Assignee: General Electric Company, Schenectady, NY (US)

( * ) Notice: Subject to any disclaimer, the term of this patent is extended or adjusted under 35 U.S.C. 154(b) by 1156 days.

(21) Appl. No.: 10/995,733

(22) Filed: Nov. 22, 2004

(65) Prior Publication Data

US 2006/0060726 A1 Mar. 23, 2006

Related U.S. Application Data

(62) Division of application No. 09/613,162, filed on Jul. 10, 2000, now Pat. No. 6,841,021.

(51) Int. Cl.
*F16L 3/22* (2006.01)
(52) U.S. Cl. ..................... 248/68.1; 248/74.1
(58) Field of Classification Search .................. 248/49, 248/62, 68.1, 74.1, 74.2, 74.3, 74.4, 316.1, 248/316.6, 230.1; 156/212, 245, 307.1, 307.3; 264/257, 258, 261
See application file for complete search history.

(56) References Cited

U.S. PATENT DOCUMENTS

| | | | |
|---|---|---|---|
| 3,856,244 A * | 12/1974 | Menshen | .................. 248/67.5 |
| 3,982,304 A | 9/1976 | Menshen | |
| 4,202,090 A | 5/1980 | Cook | |
| 4,273,465 A * | 6/1981 | Schoen | ........................ 403/391 |
| 4,393,998 A | 7/1983 | Allen et al. | |
| 4,899,969 A | 2/1990 | Bauer et al. | |
| 4,971,268 A | 11/1990 | Dobrowski et al. | |
| 5,033,701 A | 7/1991 | Kraus | |
| H1162 H | 4/1993 | Yamamoto et al. | |
| 5,234,185 A | 8/1993 | Hoffman et al. | |
| 5,271,588 A * | 12/1993 | Doyle | ........................ 248/68.1 |
| 5,435,506 A | 7/1995 | Wiley | |
| 5,615,852 A * | 4/1997 | Heidorn et al. | ............. 248/74.5 |
| 5,769,556 A | 6/1998 | Colley | |
| 5,794,897 A | 8/1998 | Jobin et al. | |
| 5,820,048 A | 10/1998 | Shereyk et al. | |
| 5,837,185 A | 11/1998 | Livesay et al. | |
| 5,887,832 A | 3/1999 | Elvegaard | |
| 5,890,684 A | 4/1999 | Stewart et al. | |
| 5,941,483 A | 8/1999 | Baginski | |
| 5,992,802 A * | 11/1999 | Campbell | ................... 248/68.1 |
| 6,103,864 A | 8/2000 | Alston et al. | |
| 6,841,021 B1 * | 1/2005 | Mesing et al. | ............. 248/68.1 |
| 7,007,900 B2 * | 3/2006 | Goodwin et al. | ........... 248/68.1 |

OTHER PUBLICATIONS

Article entitled: Low-Cost Resin Transfer Molding Process Developed for High-Temperature Polyimide Matrix Composites—hhtp://www.lerc.nasa.gov/WWW/RT1995/5000/5150v.htm.

* cited by examiner

*Primary Examiner*—Amy J Sterling
*Assistant Examiner*—Tan Le
(74) *Attorney, Agent, or Firm*—McNees Wallace & Nurick, LLC

(57) ABSTRACT

A process for forming a molded polymer resin fiber tube clamp, as well as the tube clamp formed by that process. Continuous top and bottom plies provide increased resistance to delamination/cracking as they sandwich a filler material. The tube clamp is free from exposed fiber ends so than no wear is produced on a tube being clamped.

6 Claims, 2 Drawing Sheets

POLYIMIDE RESIN AND CARBON FIBER MOLDED TUBE CLAMP

CROSS-REFERENCE TO RELATED APPLICATIONS

This application is a Divisional of allowed U.S. patent application Ser. No. 09/613,162 filed Jul. 10, 2000, now U.S. Pat. No. 6,841,021 which is hereby incorporated by reference in its entirety.

FIELD OF THE INVENTION

The present invention relates generally to gas turbine engines, and more specifically, to an improved clamp for securing tubes within the engine against movement, including vibratory movement.

BACKGROUND OF THE INVENTION

A gas turbine engine such as that used for powering an aircraft in flight includes, for example, numerous tubes for channeling various fluids through the engine during operation. Clamps are used for mounting the tubes to the engine casing, for example, at standoff brackets to accurately position the tubes and prevent their movement during operation of the engine.

Since the gas turbine engine includes various rotating components, the tubes are subject to vibratory excitation which must be controlled for preventing vibratory fatigue damage to the tubes. Conventional tube clamps used in an aircraft gas turbine engine typically have two clamp halves pivoted together at respective first ends so that the clamp halves may be opened for inserting one or more tubes between the halves, the halves then pivoted together to capture the tubes. Each clamp half includes a generally semi-circular recess which collectively surround a respective tube, and a fastener hole that extends through the tube clamp halves so that a suitable fastener, such as for example, a bolt, may be inserted through the holes, with a complimentary nut joined to the bolt for clamping together the tube clamp halves around one or more tubes contained therein. The fastener typically also extends through an engine-mounted bracket for joining the tube clamp and the tubes to the engine casing.

An example of a second prior art tube clamp design includes a base plate or lower clamp half, having a flat lower surface disposed on a support plate, a flat upper surface having an arcuate, semi-circular, first recess for receiving the tube, and a first hole spaced laterally from the first recess and extending through the base plate from the lower to upper surfaces. A capture plate or upper clamp half is positioned above the base plate and includes a lower surface facing the base plate upper surface, an upper surface, and a second hole extending through the capture plate from the lower to upper surfaces.

Clamps of the character indicated are used in aircraft construction for support of tubing in various environments, involving, for example, relatively great longitudinal displacement as in the course of wing flexure or lesser longitudinal displacements as in the case of vibratory oscillation, and elevated temperature as in the vicinity of an engine. The aircraft structure experiences high vibration levels, temperature variations, aerodynamic buffeting, and structural flexure. Often, a wear sleeve extends around the tubing, a clamp extends around the wear sleeve, and the clamp is coupled to the engine wall. The clamp is loosely coupled around the wear sleeve so that when the tubing moves relative to a wall, the wear sleeve moves axially within the clamp.

Tube clamps used within gas turbine engines are typically made of suitable metals such as for example, aluminum, stainless steel, or Inconel which are selected for use in the engine depending upon the temperature of the individual location, from relatively cool near the fan of the engine to relatively hot near the combustor and turbines. Metal tube clamps are known to abrade or chafe the tubes contained within them due to vibratory excitation of the tubes during engine operation, so that a conventional wear sleeve made of, for example, epoxy is positioned between the tube and the tube clamp to prevent undesirable wear of the tube during operation.

Because metal is known to be a poor vibration damper, metal tube clamps provide little vibratory damping of the tubes contained within them, and these tubes are subject to vibratory excitation during operation of the engine. Wear sleeves associated with these tube clamps are an additional part that must be suitably secured to the tube to prevent their liberation during operation of the engine, which is undesirable.

To combat these problems, polymer resin and fiber composite tube clamps, for example, polyimide resin and carbon fiber composite are currently being utilized in tube clamp design. Sheets or plies of composite prepreg, referred to as prepreg, are laid up into large flat plates of different thickness and cured. Clamps are then subsequently machined from these plates to meet various required configurations.

Composite tube clamps are characterized by the absence of discreet wear sleeves surrounding the tubes as would be required in metal tube clamps. A composite tube clamp will, therefore, have significant weight savings over a metal design and will also have inherent vibratory damping capability significantly greater than that which is obtainable from metal tube clamps. This damping reduces the vibratory energy in the tubes and increases the useful life of these tubes.

Composite tube clamps may be formed of conventional polymeric resins that are commercially available. For example, clamps used in the cooler regions of the engine near, for example, the fan may be made from low temperature resins like epoxy or bismaleimide (BMI). In hotter regions of the engine, polyimide resin composites such as PMR-15 polyimide matrix resin developed by the NASA Lewis Research Center and AMB-21, may be used due to their higher temperature capability. Furthermore, structural fibers may be used in a matrix for providing selective strength of the tube clamp. Conventional fibers, such as, for example, fiberglass or carbon fibers or polymeric fibers have been used in a suitable resin matrix such as those disclosed above. The fibers have been oriented at random or they have been aligned for obtaining additional strength.

These composite clamps are manufactured by laminating a plurality of prepreg sheets or plies into large flat plates of different thickness, then machining the plate into strips, and subsequently machining from these strips clamps to meet various predetermined configurations. The machining process exposes fiber ends; these machined ends of the fiber which contact the tube abrade the tube causing it to wear locally under the clamp.

Another inherent problem with a machined composite clamp is that due to its laminar design, when the clamp is installed, it frequently delaminates or cracks as a result of the load necessary to assemble it. This cracking and delamination occurs, for example, between plies in a location of maximum flatwise tension due to bending, for example, as would be caused by tightening of the fastening mechanism holding the upper and lower clamp halves against the tube. In actual use, installation failure rates of up to thirty three percent have been reported.

What is needed is a composite tube clamp that can take advantage of the weight saving properties of composite, utilizing the strength of a fiber reinforcement, thus significantly increasing the delamination/cracking resistance, while at the same time, not exposing abrasive fiber ends to create wear on a tube contained within the clamp.

SUMMARY OF THE INVENTION

The present invention provides a process for manufacturing a polymer resin fiber composite tube clamp, and the tube clamp formed by that process, which takes advantage of the weight savings of composites, and through use of a net molded fiber reinforcement, significantly increases the delamination/cracking resistance, and at the same time, does not expose abrasive fiber ends which could create wear on a tube contained within the clamp.

In one form, the present invention is a process for forming a tube clamp comprising the steps of layering curable fiber reinforced material to the contour of layup tooling having a preselected shape, curing the material and removing the cured material from the layup tooling after it has cured, retaining the preselected contours of the layup tooling to yield the desired contours for the tube clamp without exposing the fibers.

In another form, the present invention comprises a process for forming a tube clamp comprising the steps of layering curable, fiber-reinforced material to preselected contours of first layup tooling having a desired, predetermined shape, layering curable, fiber-reinforced material to the contours of second layup tooling having a desired shape, curing the material, removing the cured material from the first and second layup tooling after the fiber-reinforced material has cured while retaining the contours of the first and second layup tooling, and mating the cured layering material from the first and second layup tooling to form a net shape or near net shape article.

In yet another form, the present invention comprises forming a plurality of articles such as tube clamps as a single article in a single lay-up and curing operation as described above, edge trimming the cured material and then slicing or cutting the edge trimmed cured material into desired widths corresponding to that of the article.

In yet other embodiments, the present invention includes articles in the form of tube clamps made by the processes described above.

An advantage of the present invention is that the tube clamp will be molded to net or near net shape using fiber reinforced composite, so that machining of the clamping surface is eliminated. This molding approach will take advantage of the strength of the fiber reinforcement, thereby significantly increasing the delamination/cracking resistance, reducing the installation failure rate, while reducing production costs.

Another advantage of the present invention is the ability to dispense with the use of a wear sleeve. Because the fibers are continuous, maintaining the contour of the clamp surface, there are no exposed fiber ends with which to wear or abrade a clamped tube. Therefore, no wear sleeve is required; consequently, production costs are significantly reduced.

Yet another advantage of the present invention is that this process exposes no fiber ends that can act as an abrasive on the enclosed tube. Thus, the source of tube wear, abrasive fiber ends exposed by subsequent manufacturing operations such as machining, also is eliminated.

Still another advantage of the present invention is because there are no exposed fiber ends to abrade the tube, the need for a wear sleeve surrounding the tube is eliminated, thus reducing production costs and simplifying assembly.

Other features and advantages of the present invention will be apparent from the following more detailed description of the preferred embodiment, taken in conjunction with accompanying drawings which illustrate, by way of example, the principles of the invention.

DETAILED DESCRIPTION OF THE INVENTION

For purposes of the present invention, the word "cured" means a process by which a flexible material is made rigid.

Figure 1:
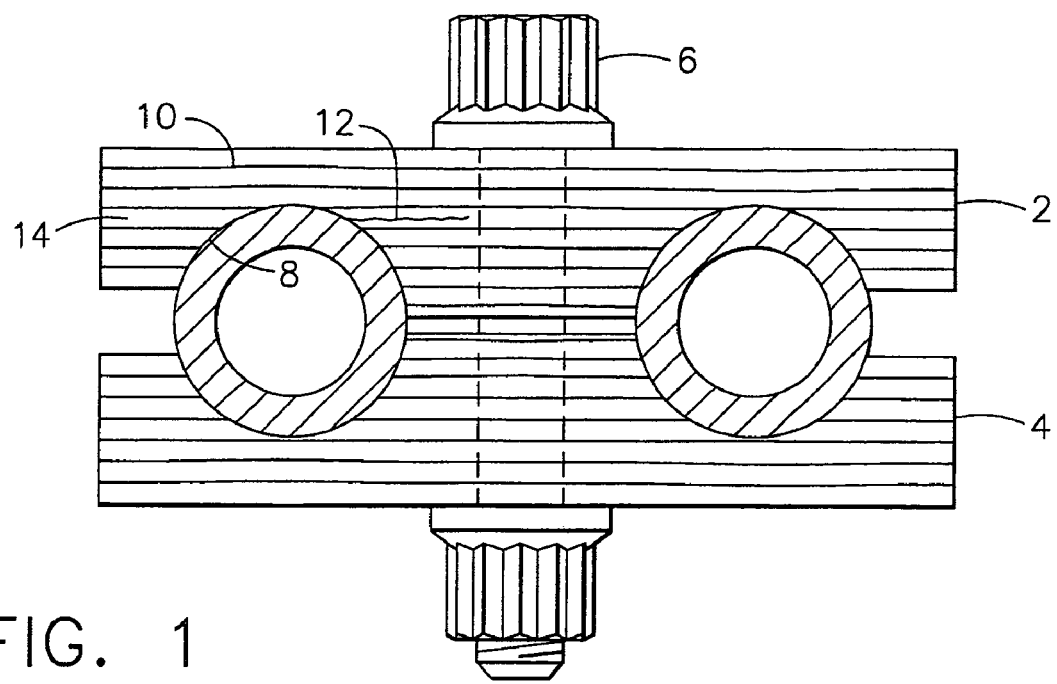
FIG. 1 is a profile view of the prior art machined clamp.

The present invention can be better appreciated by comparison to the prior art machined composite resin fiber tube clamp. FIG. 1 displays a prior art machined composite resin fiber tube clamp comprising an upper half 2 a lower half 4 and bolt 6 mating the upper half to the lower half. Each half of the prior art clamp is comprised of laminated composite plate assembled from prepreg sheet and cured. After curing, its contours are machined to retain a tube contained therein and sliced into strips of appropriate width. The machining process exposes fiber ends 8. These fiber ends 8 are not only abrasive to the tube (not shown) being encased by the prior art tube clamp, the machining process, in cutting the fibers 10, destroys the continuity of the fibers 10, particularly in the region of the tube, thus reducing the strength a continuous fiber imparts to the clamp's structural integrity.

When load is applied to the enclosed tube (not shown) upon tightening of the bolt 6, the prior art clamp will often delaminate and/or crack between plies 12 in the location of maximum flat wise tension in the area of the cut, non-continuous fibers 14 in the vicinity of the tube.

Figure 2:
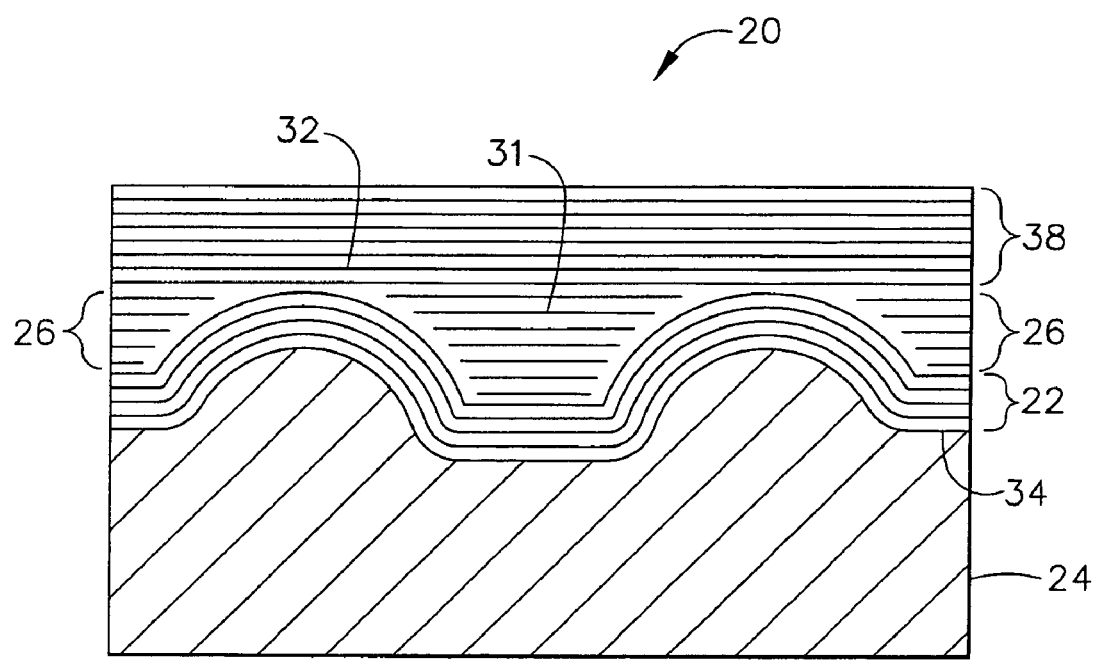
FIG. 2 is a view of prepreg material on the layup tooling.
Figure 3:
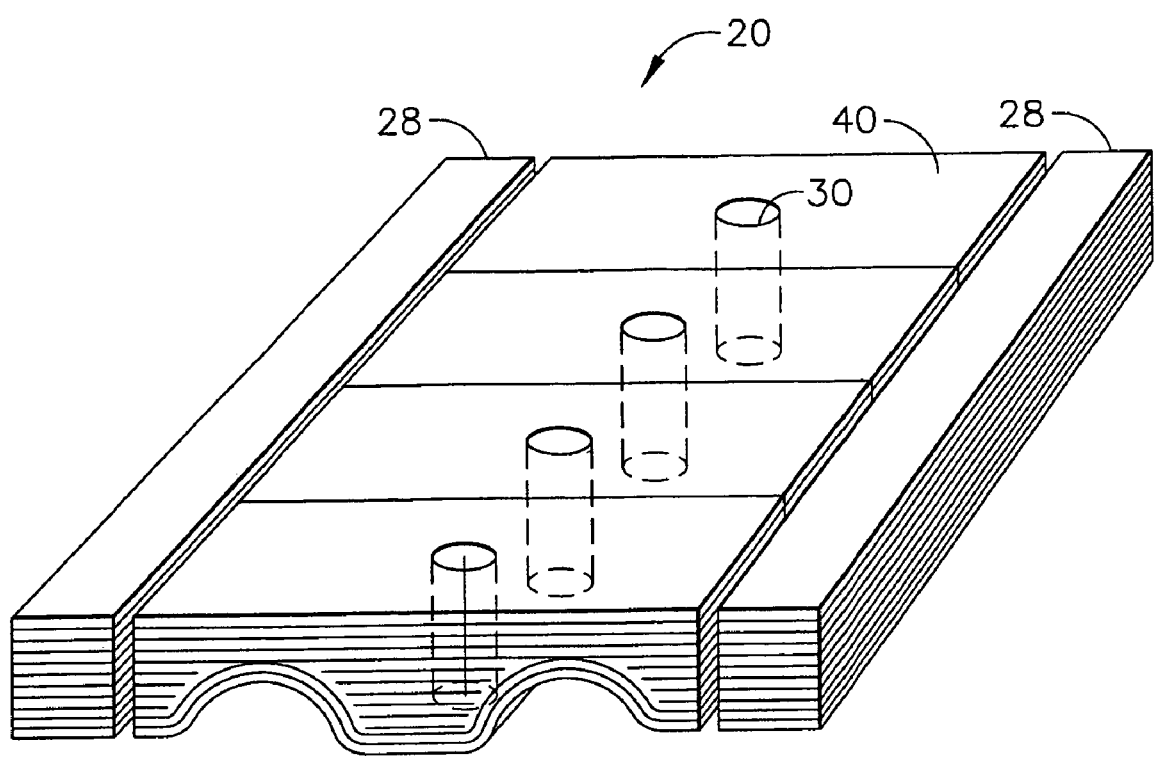
FIG. 3 is a view of the present invention after removal of the layering material from the layup tooling.

Referring now to FIGS. 2 and 3, the process for forming the improved tube clamp 20 of the present invention comprises the steps of layering curable fiber reinforced prepreg plies or sheet 22 to the contour of layup tooling 24 having a predetermined shape, removing the material 22 from the layup tooling 24 after the material 22 has been cured to a net shape or near net shape article while retaining the contour of the layup tooling 24. As used herein, the term prepreg ply is used interchangeably with the term prepreg sheet.

In the preferred embodiment, tube clamp 20 is comprised of a composite of fibers in a polymer resin matrix. Composite articles made up from films, sheets or plies are easy to design, produce, standardize, and control. In the present invention, polyimides are the polymer of choice, due to their ability to handle temperatures in excess of 650° F., an advantage in the hot sections of an aircraft engine. The hot sections of an aircraft gas turbine include the combustor and those portions aft of the combustor including the turbine sections. Other polymer resins that may be utilized include, for example, acetylene-terminated polymers such as, for example, acetylene-terminated quinoxalines, polyamide-imides, phthalocyanines, polyesters, epoxies or any other polymer resin providing high strength and stiffness. To gain additional structural strength, in the present invention carbon fibers are imbedded in the polymer, although other fibers such as, for example, fiberglass fibers, aramid fibers, metal fibers, ceramic fibers including for example, silicon carbide fibers, thermoplastic fibers or any other fibers such as for example, glass or glass/ceramic fibers including alumina, sapphire and silica may also be used. The fibers may be non-coated but frequently are coated for various reasons, such as to improve bonding to the matrix material or to protect the fiber. The only limitation on fiber selection is based on the ability of the fiber to withstand the loads and the temperatures of the selected application. In certain applications, yarn comprised of fibers may be used. Additionally, a ceramic fiber embedded in ceramic matrix (CMC), such as SiC/SiC composite may be utilized.

The fibers may be imbedded in the matrix material as uni-directionally oriented fibers in a tape or ply, fibers running bidirectionally in woven cloth, or mat having random fiber orientation. The uni-directional ply provides excellent strength in the direction parallel to the tape, while woven cloth fibers provide excellent strength in the plane of the woven cloth. Polymer infiltrated into a fiber mat having randomly oriented fibers, hereinafter also referred to as random fiber mat, is not as strong as the unidirectionally oriented plies or the woven cloth plies in their preferential directions of maximum strength, but its strength is substantially uniform in all directions.

Layup tooling 24 is fabricated by standard fabrication processes to produce a pattern that is a negative image of the final shape desired in the improved tube clamp 20. All corners in the layup tooling 24 are rounded, having a radius of about 0.05 inches to about 0.3 inches, preferably about 0.1 inches. Although square corners may be utilized, radiused corners are preferred so that stress risers are eliminated. Layup tooling 24 shown in FIG. 2 depicts only the pattern having the desired contour of a tube clamp. The layup tooling for such a tube clamp includes a plurality of straight sides that mate with the depicted pattern to provide a mold for containment. The uncured composite material must be contained, as the matrix material has a tendency to flow upon heating. Opposite the depicted pattern is a movable platen that can be used to apply pressure to compress the material as it is heated. The mold and the movable platen, usually made of a metal, form a match metal press. In an alternate embodiment, the platen may be replaced with a flexible caul if the laid up material is to be cured in an autoclave. It will be understood that if a complex configuration of the net shape or near net shape article is required, a mold having straight sides can be replaced by a mold in which each of the sides includes predetermined contours of the final product.

In another embodiment, prepreg ply is placed in intimate contact along the contour pattern of layup tooling 24. Additional plies are then layered in the tooling until a predetermined thickness is achieved (collectively referred to as "bottom ply layer 34"). When plies having unidirectional fiber are layed up, the plies can be layed up so that the fibers are parallel, or, if desired, alternating plies can be placed so that the fibers are angled at predetermined angular orientations from adjacent plies depending on the stresses that the clamp will experience when additional strength is required. For example, plies may be laid up in a pattern starting at 0°, then 45°, then 90°, then 45°, then 0° (0°/45°/90°/45°/0°). The desired thickness of the bottom ply layer 34 is about 0.01 inches to about 0.3 inches, preferably about 0.06 inches.

A top ply layer 38 is formed in a similar manner. The desired thickness of the top ply layer is about 0.01 inches to about 0.3 inches, preferably about 0.06 inches. Both the top ply layer 38 and the bottom ply layer 34 can be formed of unidirectional prepreg sheets, woven prepreg sheets or random fiber mat. Prepreg sheets comprising uni-directional fiber and woven fabric are thinner than random fiber mat that tends to be thicker. As a result, fewer mats containing chopped fiber are required to achieve the predetermined thickness than would be required using uni-directional prepreg sheets or woven cloth prepreg sheets. The bottom ply layer 34 and top ply layer 38 provide additional strength for beam bending.

One of the variations of this embodiment utilizes additional filler plies placed between the top and bottom ply layers. Referring to FIG. 2, these plies may not all be of the same shape, as some filler plies 31 may be cut to size to appropriately fill the regions in the mold between the bottom and top ply layer. In another variation, to reduce production costs, as ply cutting and ply layup is labor intensive, filler material may be sandwiched in the mold between the top ply layer 38 and the bottom ply layer. This filler material 26 may be, for example, polyimide resin, chopped fiber molding compound, plies cut to shape, or other types of fillers such as, for example, polyimide ceramic foams, or mixtures of these filler, if desired. In this manner, void regions between the top ply layer and the bottom ply layer are filled, for example, with a mix of polymer resin and chopped fiber. As previously noted, the number or shape of filler ply layers is determined by the clamp size or shape required for a specific application, but the number used can be reduced by substituting filler for some or all of the plies. The determination as to whether to substitute plies with a different filler is primarily determined by the mechanical properties required of the tube clamp, as generally, a tube clamp laid up completely from plies has superior mechanical properties in directions parallel to the plies.

Typically, each ply of polyimide carbon fiber composite mat is about 15 to 50 mils in thickness, preferably about 20-30 mils, and most preferably about 25 mils. The plies are pre-impregnated with fibers in a random pattern to save on production costs; however, in situations where increased strength is required, uni-directional pre-impregnated fiber plies may be used. These plies have a thickness of from 5-15 mils depending on the size of the fiber or fiber bundle. Optionally, pre-impregnated fiber plies can be replaced by using techniques such as resin transfer molding. Curing at an elevated temperature using a preselected pressure at a preselected temperature is preferred. This can be accomplished in an autoclave by laying a caul over top ply layer 38. Alternatively, a movable metal platen can be assembled over top ply layer 38 and pressure can be applied to the material within the mold as it is heated.

Once the material within the mold is cured, such as, for example, by autoclaving or by utilizing a match metal press technique, the molded material will maintain the shape of the layup tooling 24 as shown in FIGS. 2 and 3. If the sidewalls of the mold also include contours or features, then the molded material will also include these features. Optionally, the edges 28 of the removed cured layers may be trimmed to provide a smoother surface as required. If required, the cured material may then be sliced into strips 40 by for example, a cut off wheel, router, or grinder, to provide a clamp of required width for a specific application. Clamping holes 30, as required, may then be machined utilizing standard machining techniques.

As shown in FIG. 2, because the plies are layered to the contour as determined by the layup tooling, no machining of the clamp assembly is necessary (other than the optional edge trimming to provide smoother outside edges). Because there are no machined tube contours, there are no exposed fiber ends to abrade and cause wear on the clamped tube. Additionally, because no fibers in areas of high stress have been cut by a machining process, fibers run throughout the contour of the tube clamp, so that discontinuous fibers are eliminated in these critical areas, thereby providing additional strength for bending. As shown in FIG. 2, when unidirectional or woven fibers are used to form the bottom ply layer 34 and the top ply layer 38, the fibers are continuous and unbroken, so that strength is not compromised in these critical areas. This structure is better able to transmit loads by elimination of weaker regions where high stresses can exceed the local yield stress of the material. Typically, these high stresses occur between the plies and are the cause of delamination and the source of cracks. The continuous fiber in this region provides a significant increase in both the delamination strength and cracking strength in these regions.

The process of the present invention may be utilized to form two separate halves of a tube clamp, which are then mated together. The present invention comprises both the processes for manufacturing the tube clamp as described above, as well as the tube clamp that results from the above-described process.

The improved molded clamp design of the present invention utilizing molded polyimide resin carbon fiber was compared to a production machined polyimide resin carbon fiber tube clamp. A displacing force was applied to a sample on a hydraulic press, measuring load and deflection until failure. Failure was indicated by large deflections without commensurate increases in load.

The machined surface sample failed at 1008 lbs. and at 1013 lbs. The improved molded tube clamp of the present invention failed at 3200 lbs. and 3400 lbs., showing significant increase in the load bearing ability of the improved molded tube clamp design.

Because of the ability to transmit loads uniformly across the structure, the articles made in accordance with the present invention have increased load bearing ability so that there is less clamp failure during installation from cracking and delaminating, thereby further reducing production costs.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A tube clamp for use in a hot section of a gas turbine engine, comprising:
    a first half of cured composite material, the first half having a first portion, a second portion, and a filler material, the first portion including fibers embedded in a matrix, the fibers comprising axial surface portions and comprising fiber ends defined by radial surface portions, the first portion being of a predetermined thickness to form a bottom ply layer and having a predetermined contour conforming to at least a portion of a tube and an interface, the bottom ply layer having a contoured tube-contacting surface comprising axial surface portions of the fibers and essentially no radial surface portions, the second portion being of a predetermined thickness to form a top ply layer, the filler material being sandwiched between the top ply layer and the bottom ply layer;
    a second half of cured composite material, the second half having a first portion, a second portion, and a filler material, the first portion including fibers embedded in a matrix, the fibers comprising axial surface portions and comprising fiber ends defined by radial surface portions, the first portion being of a predetermined thickness to form a bottom ply layer and having a predetermined contour conforming to at least a portion of a tube and an interface corresponding to the interface of the first half, the bottom ply layer having a contoured tube-contacting surface comprising axial surface portions of the fibers and essentially no radial surface portions, the second portion having fibers embedded in a matrix, the second portion being of a predetermined thickness to form a top ply layer, the filler material being sandwiched between the top ply layer and the bottom ply layer; and
    means for joining the first half to the second half.

2. The tube clamp of claim 1 wherein the matrix is a polyimide resin.

3. The tube clamp of claim 1 wherein the fibers are carbon fibers.

4. The tube clamp of claim 1 wherein the filler material is formed from random mat fiber.

5. The tube clamp of claim 1 wherein the filler material is formed from prepreg sheet having oriented fibers.

6. The tube clamp of claim 1 wherein the filler material is formed from chopped fibers and polyimide resin.

* * * * *